INVENTOR.
JANIS DUMPIS
BY
Laurence M. Goodridge

Sept. 20, 1966 J. DUMPIS 3,273,875
SHOCK SPRING KIT FOR FRONT SUSPENSION
Filed Dec. 11, 1963 4 Sheets-Sheet 4

United States Patent Office 3,273,875
Patented Sept. 20, 1966

3,273,875
SHOCK SPRING KIT FOR FRONT SUSPENSION
Janis Dumpis, St. Ann, Mo., assignor to Champ-Items, Inc., St. Louis, Mo., a corporation of Missouri
Filed Dec. 11, 1963, Ser. No. 329,707
5 Claims. (Cl. 267—8)

This invention relates to a kit having parts including a coil spring for mounting the coil spring around a shock absorber of the telescoping kind, commonly referred to as a shock strut, and more particularly to a kit with parts capable of installation on the shock strut when surrounded by a main coil suspension spring of a motorcar or truck. Kits of this kind are particularly useful for installation in the front spring assembly of a motor vehicle where it is necessary to add a helper spring to the main coil spring in the front suspension system to aid the main springs which have become fatigued. This takes the sag out of the front suspension and raises the chassis to the proper position with respect to the wheels.

A most convenient and satisfactory manner of installation for an auxiliary, or helper spring of this kind, is around a standard type of telescoping shock absorber, and, for this purpose, a coil spring is the form favored. Since each wheel of a vehicle has its own separate springs and telescoping type of shock strut, installation of helper springs can be made to assist any one or more of the vehicle springs.

For several years, kits have been available which will fit the shock struts in the rear suspension system of a vehicle. One example of such a kit is shown in the Walker patent, No. 2,889,144. Since front suspensions, however, generally use coil springs and most install the shock strut within the coil spring, it will be readily apparent that prior kits would not meet the specifications for front spring installation. The limited space requirements within the coil spring of the vehicle and the desirability of retaining adjustability of initial spring tension require kit parts of a different kind then heretofore available and which will operate in a different manner. The kit parts, constructed according to this invention, provide a helper spring mounting meeting these limited space specifications, as well as adjustability for spring preloading.

Accordingly, it is one of the objects of this invention to provide a kit for mounting a helper spring on a shock strut of the telescoping kind where the shock strut itself is mounted within the coil spring of a vehicle suspension system.

It is a further object of this invention to provide means in the spring mounting on the shock strut to compensate for spring preloading requirements or the degree of helper spring assistance required.

It is still another object of this invention to provide a spring seat of true universal adaption, not only to opposite ends of a shock strut, but to different makes and models.

A kit, according to this invention, includes the usual coil spring, but the invention is mainly concerned with the seats for opposite ends which form the mounting on the shock strut for that coil spring. These seats must form a stable support for the coil spring, maintain spring alignment with the shock strut, and sustain the load imposed by the spring when fully compressed. At the same time, these seats must meet the space requirements. It is, therefore, desirable that the size of the seats be only slightly larger in diameter than the coil spring, and the coil spring be no larger in internal diameter than will just telescope over the outside of a shock strut, providing, of course, the required minimum amount of clearance. It is also desirable that the seats be universal in adaptation so as to fit opposite ends of the same shock absorber and different makes and models. These specifications are fulfilled by the instant invention which provides a seat in the form of a cup with an outside diameter only slightly large rthan the outside diameter of the coil spring.

Other objects and advantages of this invention will appear from the following detailed description which is in such clear, concise and exact terms as will enable any person skilled in the art to make and use the same when taken in conjunction with the accompanying drawings, forming a part thereof, and in which.

Figure 1:
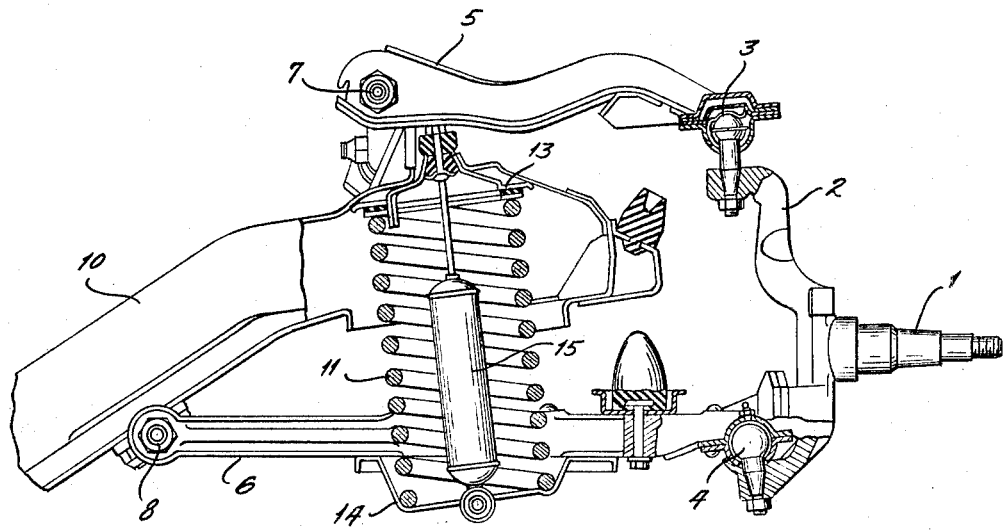
FIG. 1 is an environmental view exemplary of a form of front wheel suspension used on motor vehicles.

With reference to FIG. 1, there is shown a wheel spindle 1 suitable for journaling the front wheel of a motor vehicle on the steering knuckle 2. Upper and lower ball joints 3 and 4, respectively, suspend the spindle 2 dirigibly upon upper and lower A-frames 5 and 6, respectively. Each of these A-frames is hinged to the automotive chassis 10. Upper A-frame 5 has hinge bearings 7 and lower A-frame 6 has hinge bearings 8. Coil spring 11 is compressed between a fixed seat 13 on the chassis 10 and a movable lower seat 14 in the A-frame 6. Within the coil spring 11 is a shock strut, or shock absorber 15. FIG. 1 is typical, but there are other spring mountings where the coil spring 1 is located differently which has no effect on the use of this invention.

There are many different specific makes of shock struts 15 and the specific manner of attachment of these shock struts varies from motorcar to motorcar. In FIGS. 2–8 are illustrated four different forms which are likely to be encountered in motorcar and truck installations.

Figure 2:
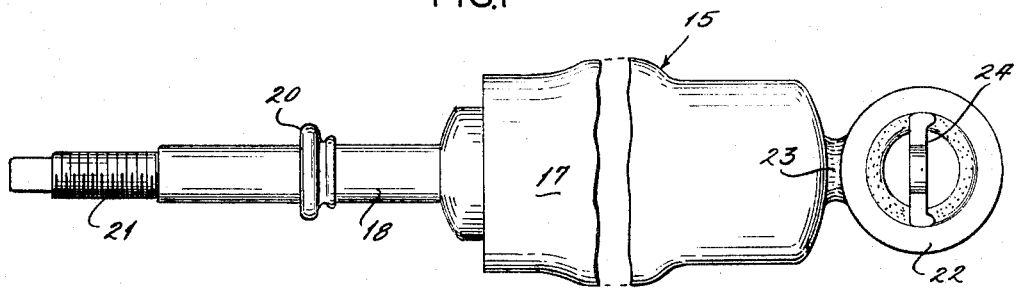
FIG. 2 is a side elevational view of a shock strut such as used in FIG. 1.
Figure 3:
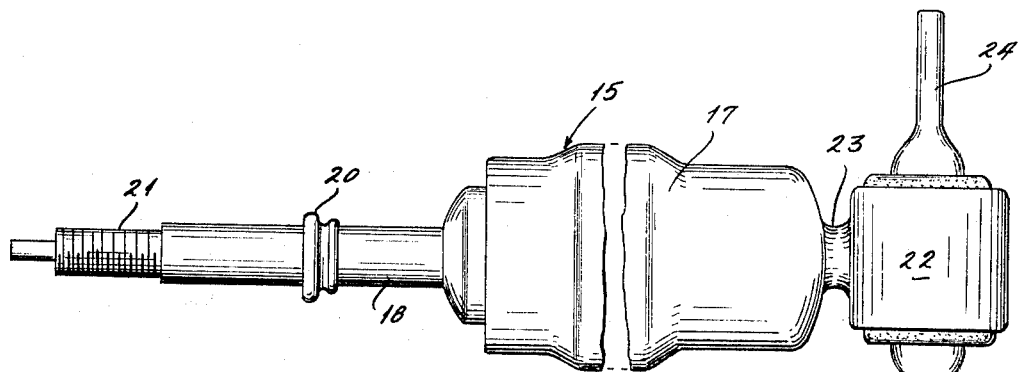
FIG. 3 is a side elevational view of the same shock strut shown in FIG. 2 turned ninety degrees.

Turning now to FIGS. 2 and 3, therein illustrated is a shock strut 15 having a substantially cylindrical body 17 and a round stem, or spindle, 18 which can telescope into the body 17. Spindle 18 carries at its lower end the usual piston, not shown, which in turn forces hydraulic fluid through restricted openings as it reciprocates within the body 17, all in a well-known manner. On the spindle 18 is a collar 20 and the end of the spindle 18 is suitably threaded at 21 for installations, such as that shown in FIG. 1. The bottom end of the body 17 has an eye 22 connected to the lower end of the body 17 by a necked down portion 23. In the eye 22 and mounted within a rubber bushing is a cross pin 24. This pin forms the connection with the lower movable spring seat 14 in the A-frame 6. Each end of the cross pin 24 is forked and these forked ends are adapted to straddle anchoring pins in the lower spring seat 14.

Figures 4, 5:
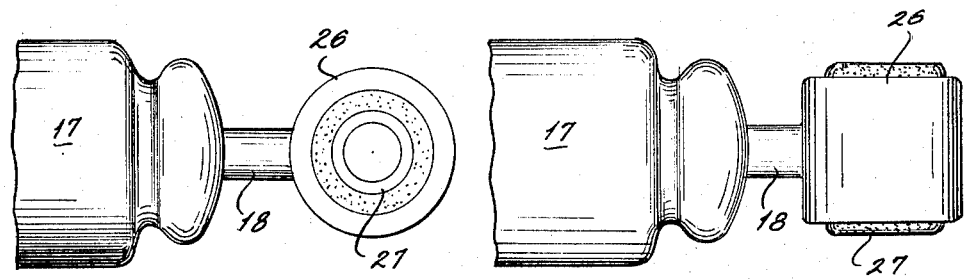
FIG. 4 is a fragmentary side elevational view of the top end of a shock strut using a modified form of attachment.
FIG. 5 is a side elevational view of the same portion of the shock strut shown in FIG. 4 turned ninety degrees.

As stated above, all shock struts are not alike, there are variations between different makes and variations in different installations. Another form of shock strut, such as that shown in FIGS. 4 and 5, provides an eye on the end of the spindle instead of a collar 20. Thus, in the modification shown, spindle 18 is secured to a metal eye 26 which in turn has a metal bushing 27 held in a rubber grommet. The lower end of this shock strut may be constructed similar to that shown in FIGS. 2 and 3.

Figure 7:
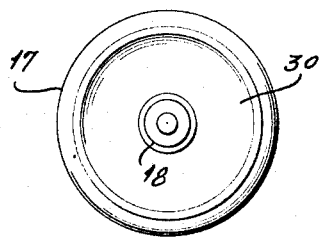
FIGS. 6 and 7 show in side elevation and top plan views another form of upper end attachment used on shock struts.
Figure 6:
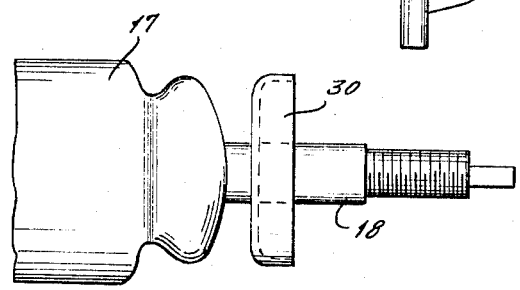

Still another variation in upper end attachment fitting is shown in FIGS. 6 and 7. As shown therein, the upper end of the spindle 18 carries an enlarged collar 30 secured rigidly to the spindle 18. The lower end of this shock strut is not shown but is often constructed such as shown in previous FIGURES 2 and 3.

Figure 8:
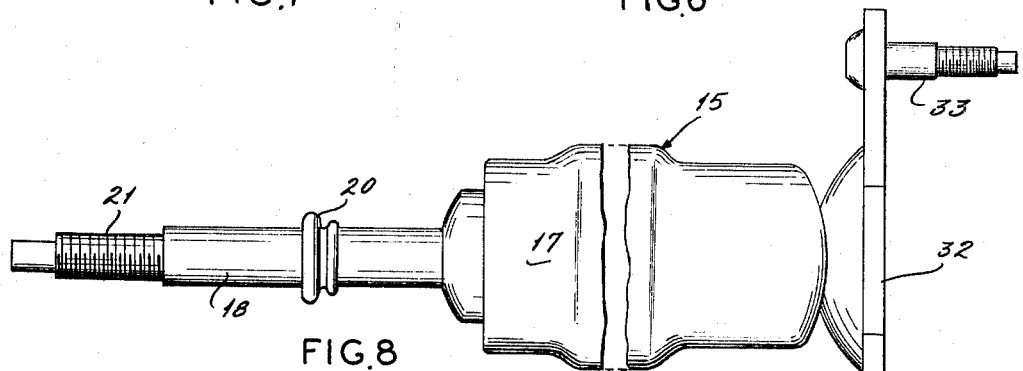
FIG. 8 is a side elevational view of still another form of shock strut showing a different lower end mounting.
Figure 12:
FIG. 12 is a top plan view of the outside of one-half a fitting which can be disposed in the aperture of the cup-shaped spring seat.
Figure 14:
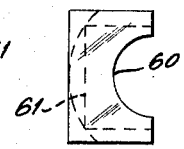
FIG. 14 is a top plan view of the outside of the fitting shown in FIG. 12 turned ninety degrees.
Figure 16:
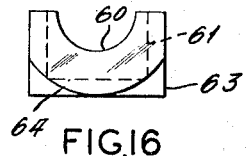
FIG. 16 is a bottom plan view of the inside of the fitting shown in FIG. 12.

Still another form of shock strut is shown in FIG. 8. In this form, the lower end of the body 17 of the shock strut is integral with a pedestal 32 carrying attaching studs 33 and 34. The spindle 18 and collar 20 in this form are substantially identical with that shown in FIGS. 2 and 3.

Figure 9:
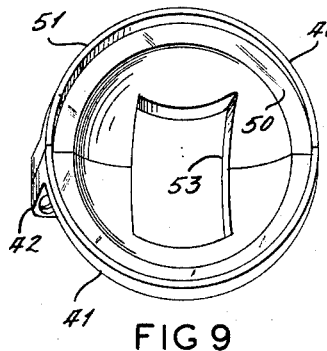
FIG. 9 is a perspective view of the inside of a cup-shaped spring seat.
Figure 10:
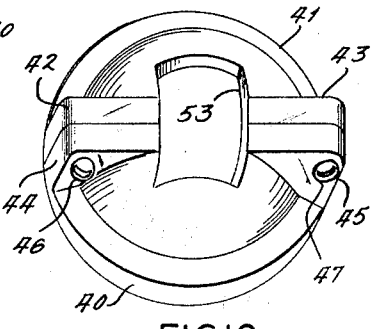
FIG. 10 is a perspective view of the outside of the same cup-shaped spring seat as shown in FIG. 9.

FIGS. 9 and 10 illustrate the inside and the outside respectively of a cup-shaped spring seat which, as hereafter shown, can be assembled with any of the forms of shock strut above described. This cup-shaped seat is formed in two halves 40 and 41 which are identical as shown in the drawing, but may be mirror images of one another. On the outer surface of the two piece seat are pairs of abutting ears 42 and 44 on one side and 43 and 45 on the other. These ears can be secured face to face by screws 46 and 47. With the screws removed, the cup-shaped seat is applied to opposite sides of the shock strut and screws 46 and 47 secure the opposite halves together in assembled relation. When the halves are assembled, as shown in FIG. 9 for example, they provide a circular spring seat 50 surrounded by the circular rim 51 for retaining the spring on the seat 50. The assembled seat is provided with a suitable shaped and sized aperture 53 to accommodate necked down portion 23, such as shown in FIGS. 2 and 3, or the similar structure in other forms of shock strut. The parts of the cup have a wedging engagement between the eye 22 and the end of cylinder 17.

Figure 11:
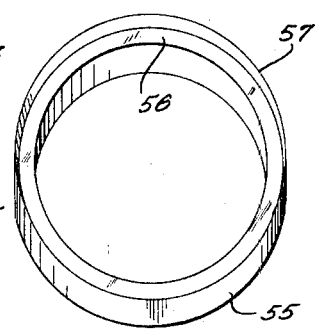
FIG. 11 is a perspective view of the spacer element which can be disposed between the cup-shaped seat and the coil spring.
Figure 19:
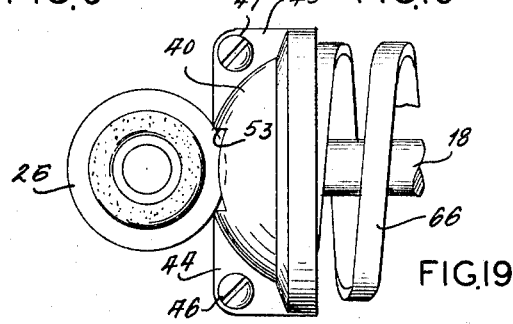
FIG. 19 is a side elevational view with parts broken away to show the manner of installation of the kit on the upper end of a shock strut such as shown in FIGS. 4 and 5.

Usually the spring of the kit rests directly on the seat 50, but if it is desired to obtain greater initial tension, or help from the auxiliary spring of the kit, then it is preferable to use one or more of the spacer sleeves of FIG. 11. The sleeve 55, shown therein, has a seat 56 substantially identical to the seat 50 and a narrow rim 57 identical in structure to the rim 51. The opposite end of the sleeve 55 is the reverse of this contour with the rim in the inside of the sleeve so as to rest upon the seat 50 within the rim 51 of the cup-like seat.

Figure 13:
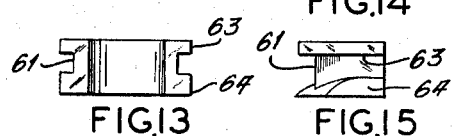
FIG. 13 is a front elevational view of FIG. 12.
Figure 15:
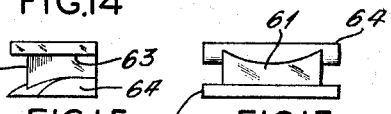
FIG. 15 is a front elevational view of FIG. 14.
Figure 17:
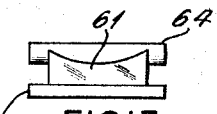
FIG. 17 is a front elevation of FIG. 16.

In order to adapt the seat, such as shown in FIGS. 9 and 10, to the stem 18, there is provided in the kit a pair of fittings each of which is a thimble-like device, as illustrated in FIGS. 12–17, inclusive. Each half of the thimble is identical nad only one is shown and described. Each half of the thimble-like device is provided with one-half a round aperture 60 which, when mated with the other thimble-like device, will accommodate a stem, or spindle, 18, but will not pass the collar 20 at the upper end of the spindle. As shown in FIGS. 13, 15 and 17, each half of the thimble-like device has a groove 61 at its outer perimeter which separates a flange 63 from a flange 64. These flanges 63 and 64 straddle the edges of the aperture 53 and are shaped accordingly. Flange 63 would be the flange which was visible if the seat was viewed as in FIG. 10. Flange 64 would be the flange visible if the seat was viewed as in FIG. 9. Each half of a thimble-like device is assembled in the part of the aperture 53 of each half of a seat 40, or 41, while the two halves are separated. Thereafter, the two halves are assembled around a stem 18 beneath the collar 20, or 30, all in a manner illustrated in FIG. 18. Spring 66 is confined between the spaced seats on the shock body 17 and on the stem 18.

Figure 18:
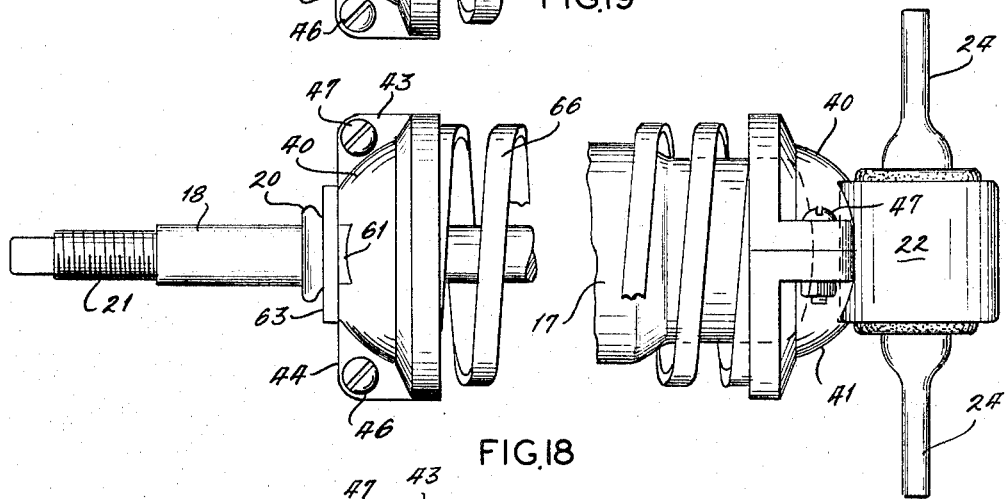
FIG. 18 is a side elevational view with parts broken away to illustrate the kit assembled with a shock strut such as shown in FIGS. 2 and 3.

Should the upper end fitting be of the kind shown at 26 in FIGS. 4 and 5, the thimble-like devices shown in FIGS. 12–17 can be dispensed with and the two halves of the seat 40 and 41 used in the same manner as at the lower end of the shock illustrated in FIG. 18.

Figure 20:
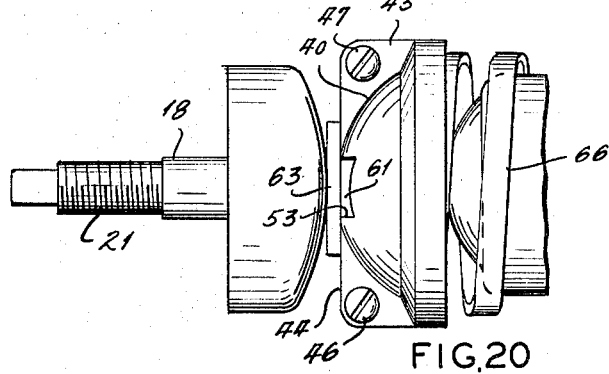
FIG. 20 is a side elevational view with parts broken away to show the installation of the kit on a shock strut upper end such as shown in FIGS. 6 and 7.

In FIG. 20 is illustrated the manner of installation when applied to a shock strut having an upper end support on the spindle 30, such as illustrated in FIGS. 6 and 7.

Figure 21:
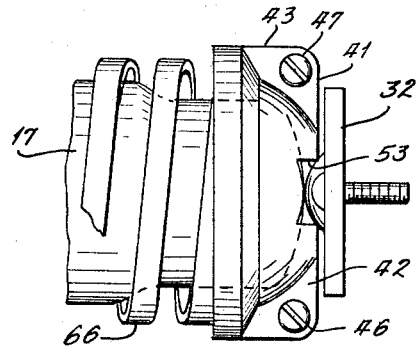
FIG. 21 is a side elevation with parts broken away to show the installation of the kit on a shock absorber such as that in FIG. 8.

FIG. 21 illustrates the manner of installation to a shock strut body 17 when provided with a mounting pedestal 32, as shown in FIG. 8 and heretofore described.

Figure 22:
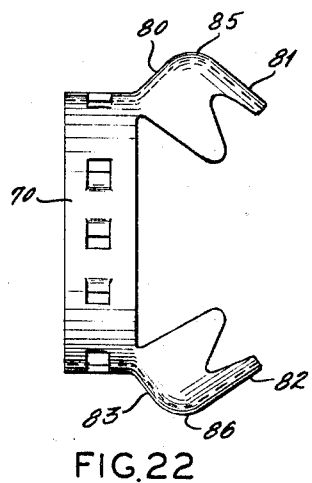
FIG. 22 shows in side elevation a modified form of cup.
Figure 23:
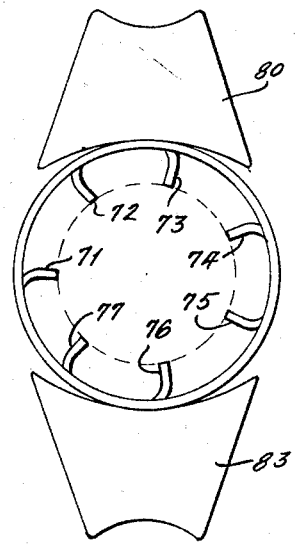
FIG. 23 shows in top plan the same structure illustrated in FIG. 22.
Figure 24:
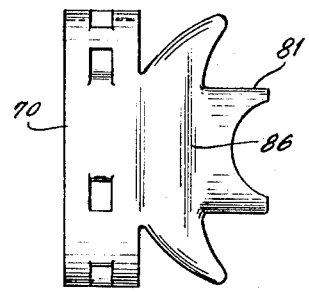
FIG. 24 shows a side view of the structure illustrated in FIG. 22.
Figure 25:
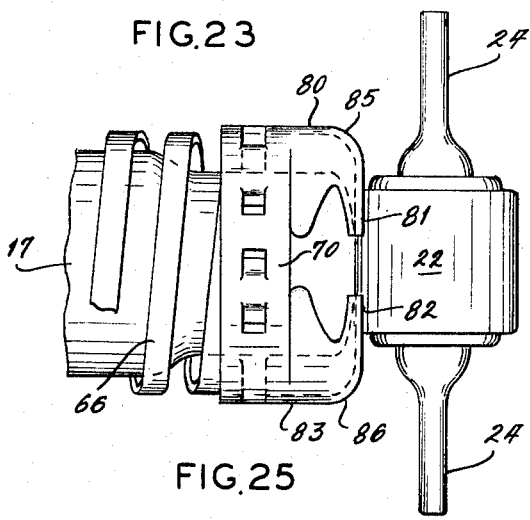
FIG. 25 is an elevational view with parts broken away illustrating the installation of the cup shown in the preceding FIGURES 22–24 on the lower end of a shock strut of the type illustrated in FIGS. 2 and 3.

The cup-like seat, shown in FIGS. 22–24, inclusive, is preferably made of sheet metal. A sheet metal ring 70 is punched out at its periphery to form a plurality of inwardly protruding ears, such as 71 through 77. These tabs 71–77, inclusive, form a spring seat upon which the end of a spring, or a spacer, may rest. The ring portion above the tabs forms a rim to confine the lower end of the spring. The lower, or opposite, end of the ring 70 is punched out to form a pair of opposed legs 80 and 83, each of which has an inturned foot portion 81 and 82. Feet 81 and 82 are concavely curved, as shown in FIG. 23, to rest upon the ring 22 of the shock strut, as shown in FIG. 25.

The embodiment, shown in FIGS. 22–24, is installed on a shock strut by sliding the ring 70 over the stem end of a shock strut to the lower end. Knee portions 85 and 86 of the legs 80 and 83 are then placed between the jaws of a vise, or similar tool, and pressure is applied to squeeze the legs 80 and 83 toward one another until the feet 81 and 82 wedge between the eye 22 and the body of the shock 17, all as shown in FIG. 25. The same cup-shaped seat, as shown in FIGS. 22–24, may be applied to the stem 18 in a similar manner so as to provide opposite seats for a spring 66.

When the cup-shaped seat is applied around neck 23, the tabs 71–77 act as spacers to contact the shock body 17 and hold the seat in alignment with the shock strut.

It is believed that the above description, when taken with the illustrations in the drawing, clearly illustrate the construction of the parts of the kit and the manner of installation on each form of shock strut. Since the procedure to be followed has been broadly outlined above, and the specific construction of the parts described, a further discussion of mounting procedures and operation of the kit parts during those procedures will be obvious.

Changes in and modifications of this structure may be made without departing from the spirit of my invention or sacrificing its advantages.

Having thus described the invention, what is claimed and desired to be secured by Letters Patent is:

1. The combination with a telescoping type of shock strut having a cylindrical body with a closed lower end, a lower end support on said body of a width to project outwardly of said body, a neck of smaller diameter than said body between said lower end support and the closed lower end of said body, a reciprocating stem smaller in diameter than said cylindrical body and projecting axially of said cylindrical body opposite from said lower end support, and an upper end support on said stem wider than said stem, of
   (a) a coil spring with an internal diameter to slip freely over said cylindrical body from said stem end,
   (b) a spring seat for one end of said coil spring mounted on said stem,
   (c) a cup having a circular spring seat for the other end of said coil spring disposed around and in spaced relation to the cylindrical body of said shock strut, said cup being apertured to surround said neck, and
   (d) wedging means for said cup engaging said lower end support and clamping said cup in position on said shock strut with the inside of said cup pressed axially of said shock strut against the bottom of said cylindrical body to firmly position said cup with respect to said shock strut and provide a stable spring seat.

2. The combination with a telescoping type of shock strut having a cylindrical body with a closed lower end, a lower end support on said body of a width to project outwardly of said body, a neck of smaller diameter than said body between said lower end support and the closed lower end of said body, a reciprocating stem smaller in diameter than said cylindrical body and projecting axially of said cylindrical body opposite from said lower end support, and an upper end support on said stem wider than said stem, of
   (a) a coil spring with an internal diameter to slip freely over said cylindrical body from said stem end,
   (b) a spring seat for one end of said coil spring, said seat having a central aperture telescoping over said stem and said upper end support on said stem,
   (c) a split thimble-like bushing retained in said aperture to rest on said upper end support,
   (d) a cup having a circular spring seat for the other end of said coil spring disposed around and in spaced relation to the cylindrical body of said shock strut, said cup being apertured to surround said neck, and
   (e) wedging means for said cup engaging said lower end support and clamping said cup in position on said shock strut with the inside of said cup pressed axially of said shock strut against the bottom of said cylindrical body to firmly position said cup with respect to said shock strut and provide a stable spring seat.

3. The combination as defined in claim 1 in which said cup is split diametrically and includes opposed wedge-shaped ears on opposite sides of the split with means in said ears holding the cup assembled.

4. The combination as defined in claim 2 in which said cup is split diametrically and includes opposed wedge-shaped ears on opposite sides of the split with means in said ears holding the cup assembled.

5. The combination with a shock strut having a telescopically related cylinder and spindle, said cylinder having a connector permanently attached thereto outside one end thereof, and said spindle having an abutment on a part thereof outside said cylinder and remote from said cylinder connector, at least one of said cylinder connector and cylinder end having a sloping surface converging inwardly toward the other of said connector and end, the improvement which comprises, a cup-shaped spring seat mounted on the shock strut, said spring seat having a part extending between said cylinder connector and cylinder, said part being wedged against said sloping surface to retain the same against movement relative to said strut, and a second cup-shaped spring seat identical with the first mentioned, said second spring seat having means for securing it on said abutment.

References Cited by the Examiner

UNITED STATES PATENTS

| 1,457,071 | 5/1923 | Gilbert | 287—52.04 X |
| 2,790,659 | 4/1957 | Malone et al. | 267—8 X |
| 2,889,144 | 6/1959 | Walker | 267—8 |
| 3,010,714 | 11/1961 | Stresnak et al. | 267—8 |
| 3,096,084 | 7/1963 | Osterhoudt | 267—8 |
| 3,181,852 | 5/1965 | Paller | 267—8 |

FOREIGN PATENTS

| 811,556 | 4/1959 | Great Britain. |
| 1,059,988 | 11/1953 | France. |

ARTHUR L. LA POINT, *Primary Examiner.*

W. B. WILBUR, R. M. WOHLFARTH,
*Assistant Examiners.*